United States Patent
Nishioka et al.

(10) Patent No.: US 11,008,046 B2
(45) Date of Patent: May 18, 2021

(54) VEHICLE BODY STRUCTURE

(71) Applicant: Mazda Motor Corporation, Hiroshima (JP)

(72) Inventors: Hiroshi Nishioka, Hatsukaichi (JP); Masanori Fukuda, Hiroshima (JP); Yusuke Desaki, Hiroshima (JP); Tomoya Ozaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 160 days.

(21) Appl. No.: 16/400,986

(22) Filed: May 1, 2019

(65) Prior Publication Data
US 2019/0344835 A1 Nov. 14, 2019

(30) Foreign Application Priority Data

May 10, 2018 (JP) .............................. JP2018-091417

(51) Int. Cl.
*B62D 25/04* (2006.01)
*B62D 25/02* (2006.01)
(Continued)

(52) U.S. Cl.
CPC ........... *B62D 25/088* (2013.01); *B62D 25/04* (2013.01); *B62D 25/20* (2013.01); *B62D 25/02* (2013.01); *B62D 25/2018* (2013.01)

(58) Field of Classification Search
CPC ............ B62D 25/2018; B62D 25/2036; B62D 25/2027; B62D 25/08; B62D 25/02
(Continued)

(56) References Cited

U.S. PATENT DOCUMENTS

| 6,022,070 A * | 2/2000 | Ashina ................. | B62D 23/005 296/205 |
| 10,286,963 B2 * | 5/2019 | Mildner ............... | B62D 27/023 |
| 2016/0023685 A1 * | 1/2016 | Fujii .................... | B62D 25/088 280/124.154 |

FOREIGN PATENT DOCUMENTS

| CN | 104590388 A | * | 5/2015 |
| CN | 205737715 U | * | 11/2016 |

(Continued)

OTHER PUBLICATIONS

Yoshitake et al., Rear Vehicle Body Structure of Automobile, JP-2016107789-A (Year: 2016).*
(Continued)

*Primary Examiner* — Dennis H Pedder
*Assistant Examiner* — Joyce Eileen Hill
(74) *Attorney, Agent, or Firm* — Alleman Hall Creasman & Tuttle LLP

(57) ABSTRACT

A vehicle body structure is provided, which includes rear wheel houses covering left and right rear wheels, left and right rear damper supports supporting upper ends of rear suspension dampers provided to the rear wheel houses, left and right rear side panels, a floor cross member coupling the rear wheel houses in a vehicle width direction, forward and downward of the rear damper supports, a rear header, left and right lower reinforcements coupled at lower ends thereof to the floor cross member and at upper ends to a region adjacent the rear damper supports, and left and right upper reinforcements coupled at lower ends thereof to upper ends of the lower reinforcements and at upper ends to the rear header. A substantially annular shape is formed in a front view by the floor cross member, the rear header, and the left and right lower upper reinforcements.

7 Claims, 7 Drawing Sheets

(51) Int. Cl.
  *B62D 25/20* (2006.01)
  *B62D 25/08* (2006.01)

(58) Field of Classification Search
  USPC .............................. 203/0.01, 0.02, 0.03, 0.04
  See application file for complete search history.

(56) References Cited

FOREIGN PATENT DOCUMENTS

| EP | 1264757 | A2 | * | 12/2002 | ............ B60J 5/0477 |
|---|---|---|---|---|---|
| JP | 11034916 | A | * | 2/1999 | |
| JP | 2005313728 | A | * | 11/2005 | |
| JP | 2013082372 | A | * | 5/2013 | |
| JP | 5239474 | B2 | * | 7/2013 | |
| JP | 2015020609 | A | * | 2/2015 | |
| JP | 2016002836 | A | * | 1/2016 | |
| JP | 2016107789 | A | * | 6/2016 | |
| JP | 2016107789 | A | | 6/2016 | |
| JP | 2016132334 | A | * | 7/2016 | |

OTHER PUBLICATIONS

Takehiro et al., Rear Body Structure of Vehicle, JP-2013082372-A (Year: 2013).*
Hiroto et al., Front Structure of Motor Vehicle, JP-5239474-B2 (Year: 2013).*
Chunming et al., Vehicle Side Wall Rear Structure and Vehicle, CN-205737715-U (Year: 2016).*
Kunkun et al., A Method For Installing Automobile Body Annular Path Structure, CN-104590388-A (Year: 2015).*
Tominaga et al., Car Body Structure, JP-11034916-A (Year: 1999).*
Kobayashi Shigetaka, "Vehicle Body Rear Part Structure" Feb. 2, 2015, Japanese Patent Office (Year: 2015).*
Kojima, Muramatsu, Nishizawa, "Vehicle Body Rear Structure of Automobile" Nov. 10, 2005, Japanese Patent Office (Year: 2005).*
Kubo, Yamazaki, "Automobile Rear Body Structure" Jul. 25, 2016, Japanese Patent Office (Year: 2016).*
Nishimura, Narahara, Nakagami, Fujii, Yoshii, Matsuoka, Nagira, "Rear Body Structure of Automobile", Jan. 12, 2016, Japanese Patent Office (Year: 2016).*

* cited by examiner

VEHICLE BODY STRUCTURE

TECHNICAL FIELD

The present disclosure relates to a body structure of a vehicle in which, for example, an annular vehicle body frame having a substantially annular shape in a front view is formed near rear damper supports which support upper ends of rear suspension dampers.

BACKGROUND OF THE DISCLOSURE

A vehicle, such as an automobile, is typically provided with rear suspension dampers which reduce the up-and-down motion of the vehicle body to secure riding comfort by expanding and contracting according to an irregularity of a road surface. It is known that, since a comparatively large load tends to act in the vehicle vertical direction and the vehicle width direction on a rear damper support which supports an upper end of each rear suspension damper, the operation stability may fall if the rigidity of the rear damper support is too low. Thus, various arts are known which improve the operation stability by improving the support rigidity of the rear suspension damper.

For example, JP2016-107789A discloses an annular vehicle body frame having a substantially annular shape in the front view, which is comprised of forward of rear damper supports which support rear suspension dampers, upper pillar parts which are upper parts of a pair of left and right side pillars which form rear edges of side door openings, a pair of left and right lower pillar parts extending in the vehicle vertical direction along rear wheel houses where the rear damper supports are provided, a floor cross member which couples lower ends of the lower pillar parts, and a roof reinforcement which couples upper ends of the upper pillar parts.

Since JP2016-107789A can improve, by the annular vehicle body frame which becomes substantially annular in the front view, the rigidity resisting deformation of the vehicle body in a substantially parallelogram shape, and the rigidity resisting bending deformation in the vehicle width direction can be improved, and thus inward collapse of the rear wheel house and its circumferences can be prevented.

Meanwhile, in order to efficiently improve the support rigidity of the rear suspension damper, it is preferred to position the annular vehicle body frame having the substantially annular shape in the front view to pass through the vicinity of the rear damper support. Here, if the lower end of the upper pillar part is located rearward and downward of an upper end like the vehicle body structure disclosed in JP2016-107789A, the substantially annular vehicle body frame can easily be formed near the rear damper support.

However, if the lower end of the upper pillar part is, for example, located forward and downward of the upper end, since the rear damper support and the lower end of the upper pillar are separated from each other in the vehicle longitudinal direction, it is difficult to form the annular vehicle body frame having the substantially annular shape in the front view like JP2016-107789A near the rear damper support, and the support rigidity of the rear suspension damper may not be efficiently improved.

SUMMARY OF THE DISCLOSURE

The present disclosure is made in view of the above situations, and one purpose thereof is to provide a body structure of a vehicle, which can improve support rigidity of rear suspension dampers, without being influenced by the shape of side pillars which form rear edges of the side door openings.

According to one aspect of the present disclosure, a body structure of a vehicle is provided, which includes left and right rear wheel houses covering left and right rear wheels of the vehicle, respectively, left and right rear damper supports supporting upper ends of rear suspension dampers provided to the rear wheel houses, left and right rear side panels forming side walls of the vehicle, integrally with the rear wheel houses, a floor cross member coupling the left and right rear wheel houses in a vehicle width direction, forward and downward of the rear damper supports, a rear header forming upper edges of a back door opening of the vehicle, left and right lower reinforcements coupled at lower ends thereof to the floor cross member and coupled at upper ends thereof to a region adjacent the rear damper supports, rearward of rear edges of side door openings of the vehicle, and left and right upper reinforcements coupled at lower ends thereof to upper ends of the lower reinforcements and coupled at upper ends thereof to the rear header. A first annular vehicle body frame having a substantially annular shape in a front view is comprised of the floor cross member, the rear header, the pair of left and right lower reinforcements, and the pair of left and right upper reinforcements.

According to this configuration, the support rigidity of the rear suspension dampers can be improved without being influenced by the shape of side pillars which forms the rear edges of the side door openings. Specifically, the body structure of the vehicle can couple the floor cross member to the rear header by the lower reinforcements and the upper reinforcements, without intervention of the side pillars which form the rear edges of the side door openings.

Therefore, the body structure can easily comprise the first annular vehicle body frame which becomes substantially annular in the front view and passes through a region adjacent the rear damper support, without being influenced by the shape of the side pillars which form the rear edge of the side door openings.

Here, since the upper ends of the upper reinforcements are coupled to the rear header, the body structure can improve the rigidity near the rear damper supports and the rigidity of the parts which form the opening edges of the back door openings by the first annular vehicle body frame which is substantially annular shape in the front view. Therefore, the body structure can improve the support rigidity of the rear suspension dampers, without being influenced by the shape of the side pillars which form the rear edges of the side door openings.

Further, the body structure may include coupling members coupling in a vehicle longitudinal direction, from adjacent the rear damper supports to rear pillars forming an opening edge of the back door opening. According to this configuration, the body structure can form a substantially triangular shape in a side view having a coupling part of the rear pillars and the coupling members as a vertex, which is comprised of the rear pillars, the coupling members, the lower reinforcements, and the upper reinforcements.

Thus, the body structure can comprise a truss structure which becomes substantially annular in the side view, comprised of the rear pillars, the coupling members, the lower reinforcements, and the upper reinforcements, and can support the region adjacent the rear damper supports by the truss structure which becomes substantially annular in the side view.

Thus, since the body structure can further improve the rigidity near the rear damper supports by the collaboration of the first annular vehicle body frame which becomes substantially annular shaped in the front view and the truss structure which is substantially annular in the side view, the support rigidity of the rear suspension dampers can be improved.

Further, the body structure may include a pair of left and right rear side frames extending in the vehicle longitudinal direction along lower ends of the rear wheel houses, a pair of left and right side sills coupled to front ends of the rear side frames and forming lower edges of the side door openings, a pair of left and right roof side rails extending in the vehicle longitudinal direction and coupled at rear ends thereof to the rear header, a pair of left and right front pillars extending forward and downward from front ends of the roof side rails, a pair of left and right side pillars coupling rear ends of the side sills and the roof side rails in a vehicle vertical direction and forming rear edges of the side door openings, and a pair of left and right hinge pillars coupling front ends of the side sills and front ends of the front pillars in the vehicle vertical direction, and forming front edges of the side door openings. The body structure may further include a second annular vehicle body frame having a substantially annular shape in the front view by passing through a cowl box coupling upper parts of the hinge pillars, and the second annular vehicle body frame may be adjacent a pair of left and right front damper supports supporting front suspension dampers of the vehicle, third annular vehicle body frames each having a substantially annular shape in a side view, and each formed along the side door openings, by being comprised of the side sills, the roof side rails, the front pillars, the side pillars, and the hinge pillars, and fourth annular vehicle body frames each having a substantially annular shape in the side view, and each comprised of the rear side frames, the roof side rails, the side pillars of the third annular vehicle body frames, the lower reinforcements of the first annular vehicle body frame, and the upper reinforcements of the first annular vehicle body frame.

According to this configuration, the body structure can improve more certainly the support rigidity of the front suspension dampers, and the support rigidity of the rear suspension dampers in the entire vehicle. Specifically, since the side pillars can be shared by the third annular vehicle body frames and the fourth annular vehicle body frames, and the lower reinforcements and the upper reinforcements can be shared by the first annular vehicle body frames and the fourth annular vehicle body frames, the body structure can couple in the vehicle longitudinal direction the first annular vehicle body frame which passes through the region adjacent the rear damper supports to the second annular vehicle body frame which passes through the region adjacent the front damper supports, without increasing the number of components.

Therefore, since the body structure can couple the front damper supports to the rear damper supports, it can improve the rigidity near the front suspension damper supports, and the rigidity near the rear damper supports in the entire vehicle. Further, since the body structure can distributedly transfer a load which acts on the front damper supports and the rear damper supports efficiently to a farther part of the vehicle body via the entire vehicle body, it can improve the riding comfort.

Therefore, by providing the third annular vehicle body frames and the fourth annular vehicle body frames which become substantially annular in the side view, the body structure can improve more certainly the support rigidity of the front suspension dampers and the support rigidity of the rear suspension dampers in the entire vehicle.

Further, the vehicle body structure may include rear side doors covering rear parts of the side door openings. Each of the side pillars may include a door hinge configured to openably and closably support a rear end of the rear side door. According to this configuration, the vehicle body structure of the vehicle can support openably and closably the rear end of the rear side door by the third annular vehicle body frames and the fourth annular vehicle body frames which become substantially annular in the side view, and thus it can improve the support rigidity of the rear side doors.

Further, when an object collides with a side part of the vehicle, the body structure can distributedly transfer the impact load acting inwardly in the vehicle width direction through the rear side doors from the third annular vehicle body frames and the fourth annular vehicle body frames which become substantially annular in the side view to the first annular vehicle body frame and the second annular vehicle body frame which become substantially annular in the front view.

Thus, the body structure can further reduce the entry of the rear side doors into the cabin in a side collision. Therefore, since the rear side doors are coupled to the side pillars via the door hinges, the body structure can improve the support rigidity of the rear side doors, and the side collision performance, as well as the support rigidity of the front suspension dampers and the support rigidity of the rear suspension dampers.

Further, an opening to which a window glass may be attached may be formed between the side pillars and the upper reinforcement in each of the fourth annular vehicle body frames. According to this configuration, the body structure can improve the visibility of the rear side part of the vehicle, while securing the support rigidity of the front suspension dampers and the support rigidity of the rear suspension dampers.

The side pillars may be straight members coupling a rear end of the side sills and the roof side rails in the vehicle vertical direction. According to this configuration, since the side pillars are substantially straight members, when forming the third annular vehicle body frames and the fourth annular vehicle body frames which share the side pillars, all the members which constitute the respective annular vehicle body frames may be substantially straight to form perfect rectangular shapes, without having any deflection or bending points, which improves the rigidity of the annular vehicle body frames.

DETAILED DESCRIPTION OF THE DISCLOSURE

Hereinafter, one embodiment of the present disclosure will be described with reference to the accompanying drawings. A vehicle 1 of this embodiment is a so-called "hatchback" vehicle in which a cargo space is provided to a rear part of a cabin which holds passengers, and a rear end of the cargo space is openably covered with a back door (also referred to as a "liftgate" or "hatch"). A vehicle body structure of such a vehicle 1 will be described using FIGS. 1 to 7.

Figure 1:
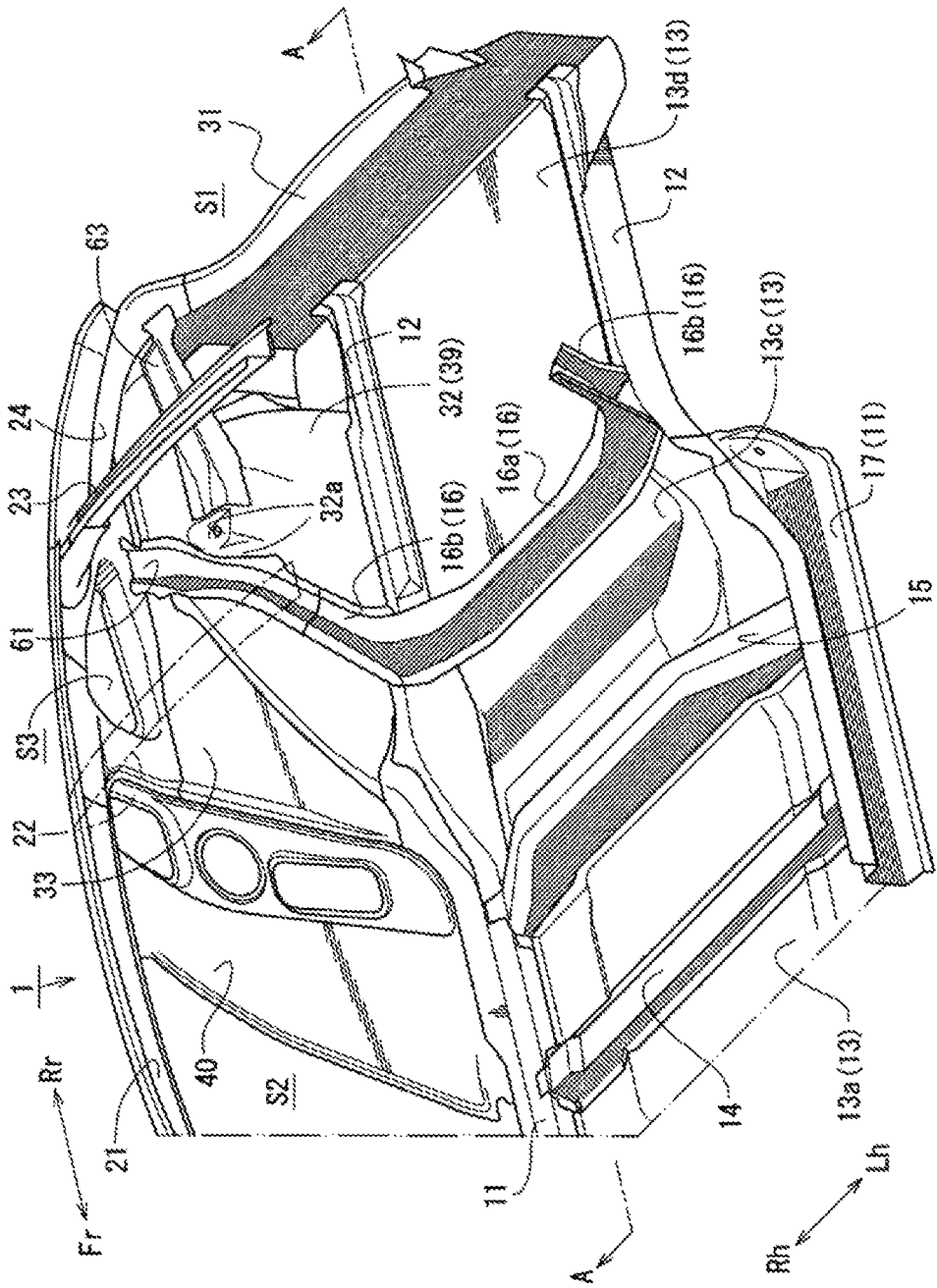
FIG. 1 is a perspective view illustrating an appearance of a vehicle, seen from an upper front side.
Figure 2:
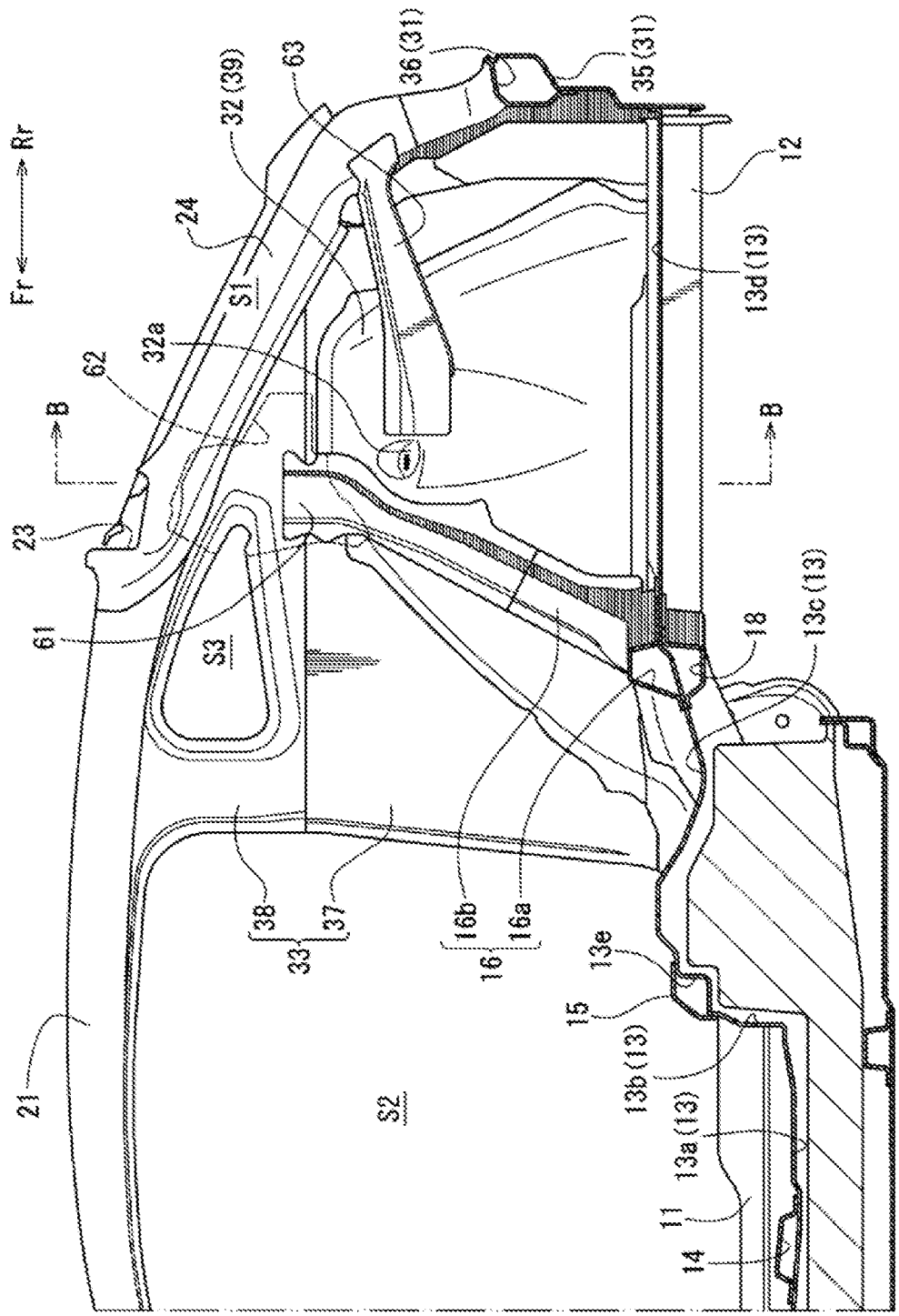
FIG. 2 is a cross-sectional view taken along a line A-A in FIG. 1.
Figure 3:
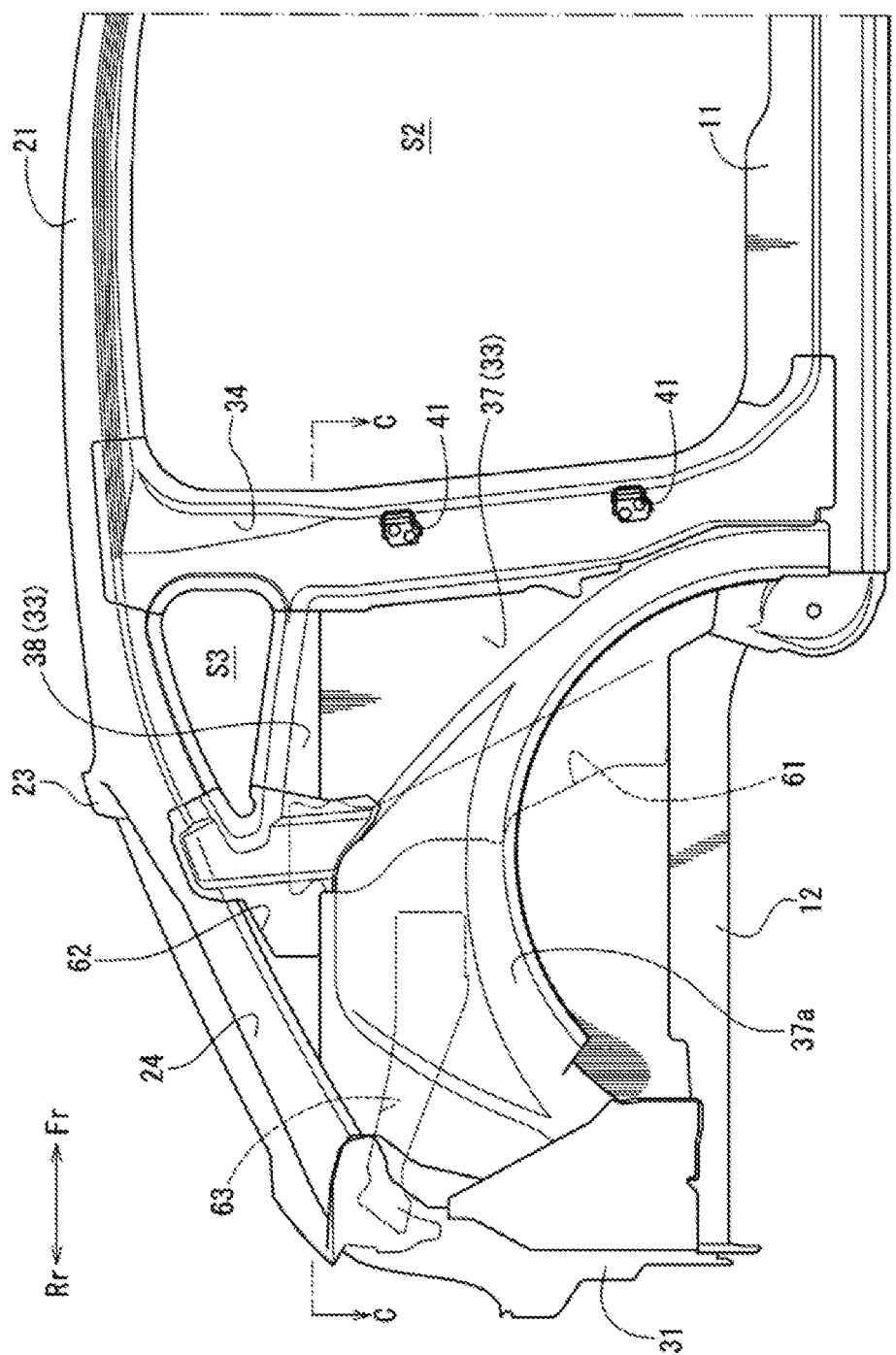
FIG. 3 is a right side view of a vehicle body rear part.
Figure 4:
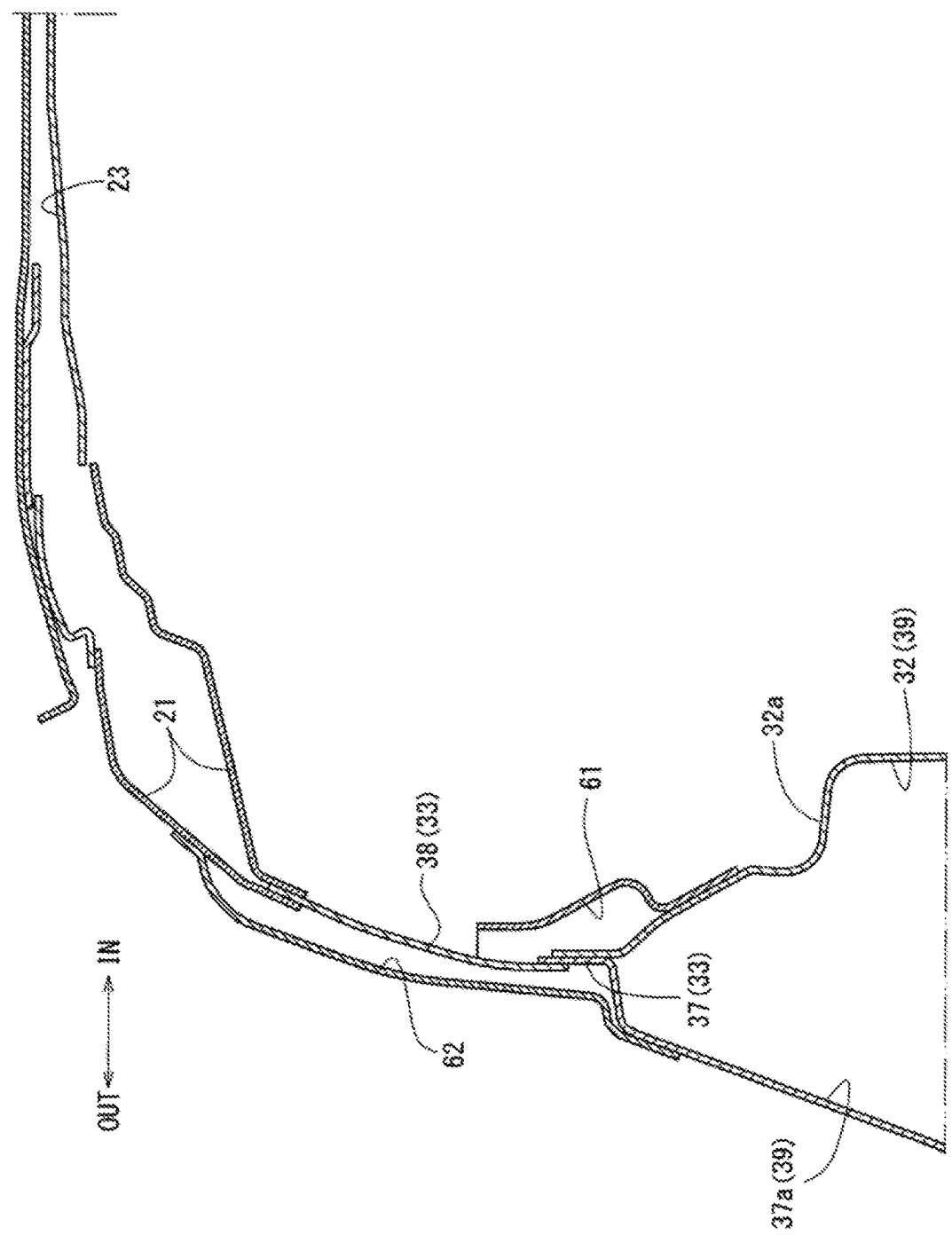
FIG. 4 is a cross-sectional view taken along a line B-B in FIG. 2.
Figure 5:
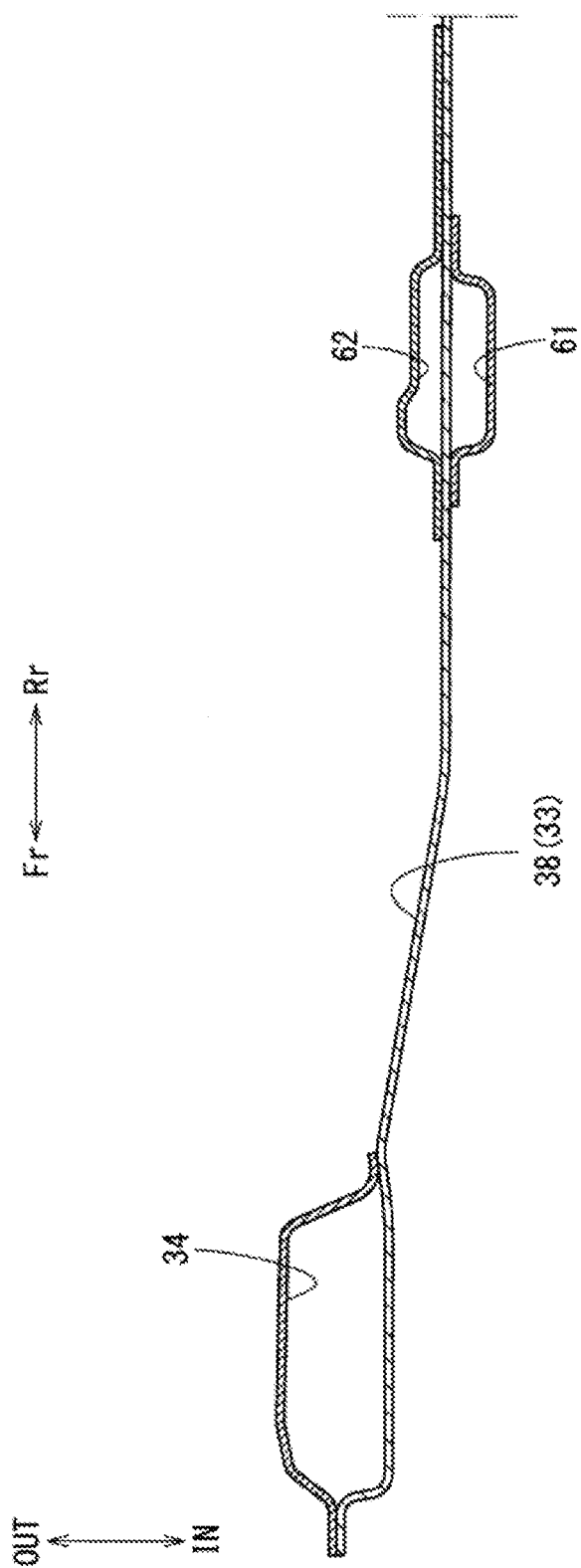
FIG. 5 is a cross-sectional view taken along a line C-C in FIG. 3.
Figure 6:
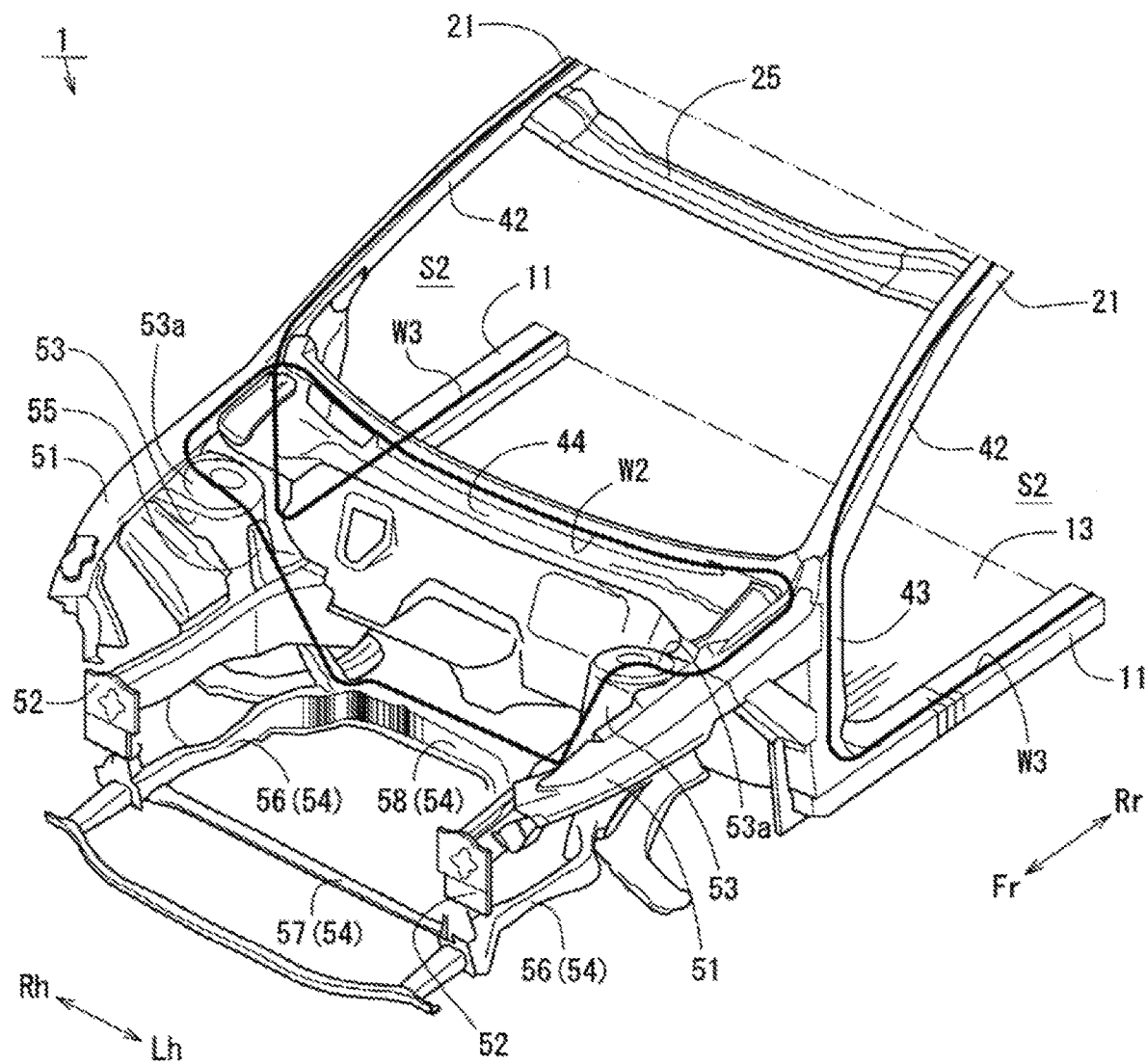
FIG. 6 is a perspective view of a vehicle body front part, seen from an upper front side.
Figure 7:
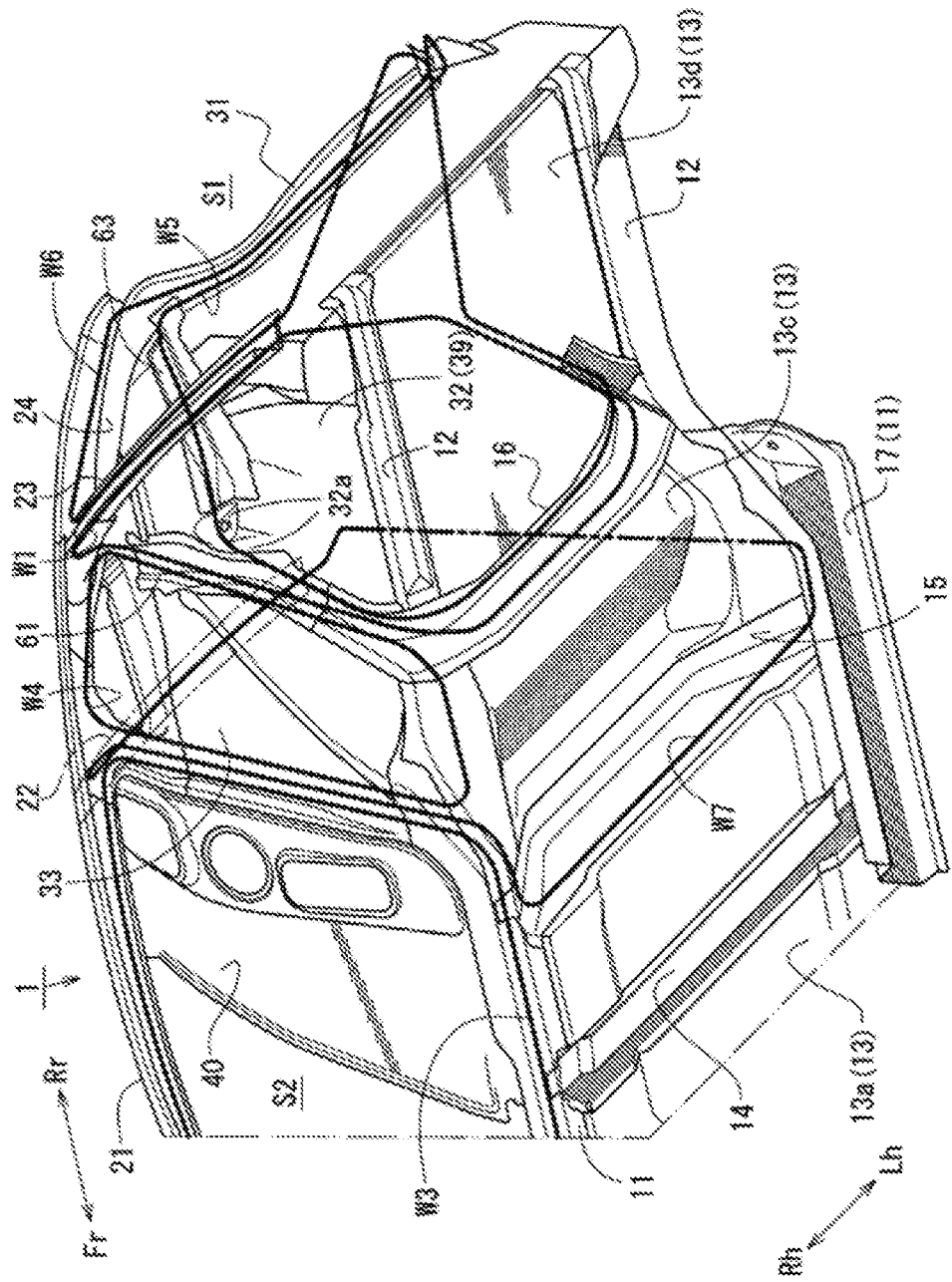
FIG. 7 is a view illustrating an annular vehicle body frame.

FIG. 1 illustrates a perspective view of an appearance of the vehicle 1, seen from an upper front side. FIG. 2 illustrates a cross-sectional view taken along a line A-A in FIG. 1. FIG. 3 illustrates a right side view of a vehicle body rear part. FIG. 4 illustrates a cross-sectional view taken along a line B-B in FIG. 2. FIG. 5 illustrates a cross-sectional view taken along a line C-C in FIG. 3. FIG. 6 illustrates a perspective view of a vehicle body front part, seen from an upper front side. FIG. 7 illustrates a view illustrating an annular vehicle body frame.

Since the vehicle 1 of this embodiment is laterally symmetrical, illustration of components which constitute the left side part of the vehicle is omitted in FIG. 1, and similarly, illustration of a third annular vehicle body frame W3 and a fourth annular vehicle body frame W4 on the left side are omitted in FIG. 7. Further, in order to clarify the illustration in FIG. 1, a roof reinforcement 22 is illustrated by two-dot chain lines.

In the drawings, arrows Fr and Rr indicate vehicle longitudinal directions, where the arrow Fr indicates front or forward, and the arrow Rr indicates rear or rearward. Further, arrows Rh and Lh indicate vehicle width directions, where the arrow Rh indicates the right direction, and the arrow Lh indicates the left direction. In addition, an arrow IN indicates an inward direction in the vehicle width direction, and an arrow OUT indicates an outward direction in the vehicle width direction.

As illustrated in FIG. 1, the vehicle 1 of this embodiment includes a pair of left and right side sills 11 extending in the vehicle longitudinal direction at positions separated from each other in the vehicle width direction, a pair of left and right rear side frames 12 coupled to rear end of the side sills 11 and extending rearward, a floor panel 13 which constitutes a floor surface of the vehicle 1 between the left and right side sills 11 and the left and right rear side frames 12, a first floor cross member 14 and a second floor cross member 15 which couple the left and right side sills 11 in the vehicle width direction, and a third floor cross member 16 which couples the left and right rear side frames 12 in the vehicle width direction.

As illustrated in FIG. 1, the vehicle 1 further includes a pair of left and right roof side rails 21 extending in the vehicle longitudinal direction at positions separated from each other in the vehicle width direction and above the left and right side sills 11, a roof panel (not illustrated), the roof reinforcement 22, and a rear header 23 which couple the left and right roof side rails 21 in the vehicle width direction, and a pair of left and right rear pillars 24 extending rearwardly from rear ends of the roof side rails 21.

In addition, as illustrated in FIG. 1, the vehicle 1 includes a rear end 31 which couples the left and right rear pillars 24 in the vehicle width direction and forms a rear wall of the cargo space, a pair of left and right wheel house inners 32 which cover rear wheels (not illustrated) of the vehicle 1, a pair of left and right rear side panels 33 which form side walls of the vehicle 1 together with the wheel house inners 32, and a pair of left and right side pillars 34 (see FIG. 3) which couple rear ends of the side sills 11 to the roof side rails 21. Note that each side pillar is a substantially straight member.

The vehicle 1 constitutes a space forward of the third floor cross member 16 as a cabin and a space rearward of the third floor cross member 16 as the cargo space, out of a space surrounded by the left and right side sills 11, the left and right rear side frames 12, the left and right roof side rails 21, the left and right rear pillars 24, the rear end 31, and the left and right wheel house inners 32, and the left and right rear side panels 33.

Further, the vehicle 1 constitutes an opening surrounded by the rear header 23, the left and right rear pillars 24, and the rear end 31 as a back door opening S1 which is openably covered by the back door, and an opening surrounded by the side sill 11, the roof side rail 21, the side pillar 34, and a hinge pillar 43 (see FIG. 6) which will be described later as a side door opening S2 through which person(s) gets on and off the vehicle and which is openably covered by a side door.

Each component of the vehicle 1 described above will be described further in detail. As illustrated in FIG. 1, each of the pair of left and right side sills 11 is a member which forms a part of a vehicle body frame of a lower part of the vehicle, and is formed to have the length in the vehicle longitudinal direction in which a rear end thereof is located forward of the third floor cross member 16 and a front end is located at a front end of the cabin.

In more detail, each side sill 11 is comprised, in a lateral cross section (i.e., cut vertically in the vehicle width direction), of a side sill inner 17 having a substantially hat shape protruding inwardly in the vehicle width direction, and a side sill outer (not illustrated) having a substantially hat shape protruding outwardly in the vehicle width direction. Here, a "hat shape" has a protrusion surrounded by a "brim."

Each side sill 11 forms a closed section extending in the vehicle longitudinal direction by joining, in the vehicle width direction, the side sill outer (not illustrated) located outwardly in the vehicle width direction to the side sill inner 17 located inwardly in the vehicle width direction.

As illustrated in FIG. 1, each of the pair of left and right rear side frames 12 is a member which forms a part of the vehicle body frame of the lower part of the vehicle, in which a front end thereof is joined to a rear end of the corresponding side sill 11, and a rear end is joined to the rear end 31. In more detail, each rear side frame 12 is comprised, in a lateral cross section in the vehicle width direction, of a side frame lower (not illustrated) having a substantially hat shape protruding downwardly, a side frame upper (not illustrated) having a substantially plate shape.

This rear side frame 12 forms a closed section extending in the vehicle longitudinal direction by joining the side frame upper located upward to the side frame lower located downward.

As illustrated in FIGS. 1 and 2, the floor panel 13 is a panel member which forms the floor surface of the vehicle 1 between the left and right side sills 11 and between the left and right rear side frames 12, and is formed in a stepped shape in which a part thereof rearward of the second floor cross member 15 is located above a part thereof forward of the second floor cross member 15.

In more detail, as illustrated in FIGS. 1 and 2, the floor panel 13 is comprised of a first floor surface part 13a which forms the floor surface of the cabin, forward of the second floor cross member 15, a rising part 13b which stands upwardly from a rear end of the first floor surface part 13a, a second floor surface part 13c which extends rearwardly from an upper end of the rising part 13b, and forms the floor surface of the cabin above the first floor surface part 13a, and a third floor surface part 13d which extends rearwardly from a rear end of the second floor surface part 13c, and forms the floor surface of the cargo space.

As illustrated in FIG. 2, a recessed part 13e is formed in an upper part of the rising part 13b. The recessed part 13e is formed to recess rearwardly and downwardly by, in a longitudinal section (i.e., cut vertically in the vehicle longitudinal direction), bending the rising part rearwardly and then bending upwardly. Note that the recessed part 13e of the rising part 13b is formed to have a smaller cross-sectional area as it extends outwardly in the vehicle width direction.

As illustrated in FIGS. 1 and 2, the first floor cross member 14 constitutes the vehicle body frame extending in the vehicle width direction together with the floor panel 13, by coupling the left and right side sills 11 in the vehicle width direction at substantially the center of the cabin in the vehicle longitudinal direction.

In more detail, as illustrated in FIG. 2, the first floor cross member 14 is formed by extending in the vehicle width direction a substantially hat-shaped cross section protruding upwardly. The first floor cross member 14 forms a closed section extending in the vehicle width direction by joining at both ends in the vehicle width direction to the side sills 11 and joining a lower surface thereof to the first floor surface part 13a of the floor panel 13.

As illustrated in FIG. 2, the first floor cross member 14 constitutes the vehicle body frame extending in the vehicle width direction by forming, together with the first floor surface part 13a of the floor panel 13, a substantially rectangular closed section extending in the vehicle width direction.

As illustrated in FIGS. 1 and 2, the second floor cross member 15 constitutes the vehicle body frame extending in the vehicle width direction together with the floor panel 13, which couples the left and right side sills 11 in the vehicle width direction at a position separated rearwardly from the first floor cross member 14.

In more detail, as illustrated in FIG. 2, the second floor cross member 15 is formed in a substantially inverted L-shaped longitudinal cross section having a front surface and an upper surface. The second floor cross member 15 is joined to the side sills 11 at both ends in the vehicle width direction, and joined, by the front surface and the upper surface, to the rising part 13b and the second floor surface part 13c of the floor panel 13, respectively. As illustrated in FIG. 2, the second floor cross member 15 constitutes the vehicle body frame extending in the vehicle width direction by forming, together with the recessed part 13e of the floor panel 13, a closed section extending in the vehicle width direction.

Note that the second floor cross member 15 forms the closed section together with the recessed part 13e of the floor panel 13 in FIG. 2. However, at both ends in the vehicle width direction, the second floor cross member 15 is joined, by the front surface and the upper surface, to the first floor surface part 13a and the second floor surface part 13c of the floor panel 13, respectively, to form a closed section by the first floor surface part 13a, the rising part 13b, and the second floor surface part 13c.

As illustrated in FIGS. 1 and 2, the third floor cross member 16 constitutes the vehicle body frame extending in the vehicle width direction, together with the floor panel 13, by coupling, in the vehicle width direction, parts of the left and right rear side frames 12 near front ends to lower parts of the left and right wheel house inners 32, which will be described later. In more detail, as illustrated in FIG. 1, the third floor cross member 16 is comprised of a member center part 16a joined to the floor panel 13, and a pair of left and right member end parts 16b extending upwardly and rearwardly from both ends of the member center part 16a in the vehicle width direction.

As illustrated in FIG. 2, the member center part 16a is formed in a substantially hat-shaped longitudinal cross section protruding upwardly. As illustrated in FIG. 1, each member end part 16b has a substantially hat-shaped cross section which continues from the member center part 16a, and extends upwardly and rearwardly from the member center part 16a along the wheel house inners 32.

The third floor cross member 16 forms a closed section extending in the vehicle width direction by joining both ends of the member center part 16a in the vehicle width direction to the left and right rear side frames 12 and joining an lower surface of the member center part 16a to the floor panel 13, and forms a closed section extending in the vehicle vertical direction by joining the member end parts 16b to the wheel house inners 32.

The third floor cross member 16 constitutes a vehicle body frame extending in the vehicle vertical direction and the vehicle width direction by forming the closed section extending in the vehicle vertical direction and the vehicle width direction, together with the left and right wheel house inners 32, the rear side frames 12, and the floor panel 13.

As illustrated in FIG. 2, a fourth floor cross member 18 which couples the left and right rear side frames 12 is disposed below the third floor cross member 16. As illustrated in FIG. 2, the fourth floor cross member 18 is formed in a substantially hat-shaped longitudinal cross section which protrudes downwardly. The fourth floor cross member 18 forms a closed section extending in the vehicle width direction by being joined to the third floor cross member 16, having the floor panel 13 therebetween.

Although detailed illustration is omitted, each of the pair of left and right roof side rails 21 forms a closed section extending in the vehicle longitudinal direction by joining, in the lateral cross section, a roof side rail outer having a cross section protruding outwardly in the vehicle width direction to a roof side rail inner which is located inward in the vehicle width direction of the roof side rail outer, and has a cross section protruding inwardly in the vehicle width direction.

Each roof side rail 21 constitutes a vehicle body frame extending in the vehicle longitudinal direction by forming the closed section extending in the vehicle longitudinal direction by the roof side rail outer and the roof side rail inner.

Although detailed illustration is omitted, the roof reinforcement 22 includes a plurality of roof reinforcements disposed at positions separated from each other in the vehicle longitudinal direction between the rear header 23 which couples rear ends of the roof side rails 21 in the vehicle width direction and a front header 25 (see FIG. 6) which couples front ends of the roof side rails 21 in the vehicle width direction.

Although detailed illustration is omitted, each roof reinforcement 22 has a substantially hat-shaped longitudinal cross section protruding downwardly, and forms a closed section extending in the vehicle width direction together with the roof panel (not illustrated).

Note that as illustrated by the two-dot chain line in FIG. 1, one of the roof reinforcements 22 located rearmost couples the left and right roof side rails 21 in the vehicle width direction at a position in the vehicle longitudinal direction which is substantially the same as the position of upper ends of the side pillars 34 which will be described later.

As illustrated in FIG. 1, the rear header 23 couples in the vehicle width direction, the vicinity of joint parts to each other, where each joint part joins the roof side rails 21 to the rear pillars 24. Although detailed illustration is omitted, the rear header 23 forms a closed section extending in the vehicle width direction by joining a rear header upper having a longitudinal cross-sectional shape protruding upwardly to a rear header lower having a longitudinal cross-sectional shape protruding downwardly and located below the rear header upper. The rear header 23 constitutes a vehicle body frame extending in the vehicle longitudinal direction by the rear header upper and the rear header lower forming a closed section extending in the vehicle longitudinal direction.

Although detailed illustration is omitted, each of the pair of left and right rear pillars 24 is comprised of a rear pillar upper having a longitudinal cross-sectional shape protruding upwardly, and a rear pillar lower having a longitudinal cross-sectional shape protruding downwardly and located below the rear pillar upper.

Each rear pillar 24 forms a closed section extending rearwardly and downwardly from a rear end of the roof side rails 21 so as to continue to the closed section of the roof side rails 21 by joining the rear pillar upper to the rear pillar lower. The rear pillars 24 constitutes a vehicle body frame extending in a substantially vehicle longitudinal direction by the rear pillar upper and the rear pillar lower forming the closed section extending in the substantially vehicle longitudinal direction.

As illustrated in FIGS. 1 and 2, the rear end 31 is comprised of a rear end panel 35 which is a panel member used as a rear wall of the cargo space, and a rear end cross member 36 joined to a front surface of the rear end panel 35. As illustrated in FIG. 2, the rear end panel 35 is a panel member having a thickness in the vehicle longitudinal direction, and is disposed so as to stand up from a rear end of the floor panel 13.

As illustrated in FIG. 2, the rear end cross member 36 has a substantially hat-shaped longitudinal cross section protruding forward, and forms a closed section extending in the vehicle width direction by joining both ends in the vehicle width direction to the left and right rear pillars 24, and joining a rear surface to the rear end panel 35 so that the closed section continues to the closed sections of the rear pillars 24.

The rear end cross member 36 constitutes a vehicle body frame extending in the vehicle width direction by forming together with the rear end panel 35 the closed section extending in the vehicle width direction which is continuous to the closed sections of the left and right rear pillars 24.

As illustrated in FIGS. 2 and 4, each of the pair of left and right wheel house inners 32 is formed in a substantially dome shape which is bulged inwardly in the vehicle width direction from the rear side panel 33 and is disposed rearward of a rear edge of the side door opening S2.

As illustrated in FIGS. 1 and 2, a rear damper support 32a which supports an upper end of a rear suspension damper (not illustrated) which constitutes one of rear suspensions is formed in an upper part of the wheel house inner 32. That is, each wheel house inner 32 functions as a rear suspension tower which supports the rear suspension damper.

In more detail, as illustrated in FIGS. 1 and 2, the rear damper support 32a is recessed in an upper part of the wheel house inner 32, at a position rearward of the third floor cross member 16, and an insertion hole into which an upper end of each rear suspension damper is inserted is formed. The rear damper support 32a supports the upper end of the rear suspension damper by being fastened to the upper end of the rear suspension damper inserted in the insertion hole.

As illustrated in FIGS. 2 to 4, each of the pair of left and right rear side panels 33 is a panel member which covers a part surrounded by the side sill 11, the rear side frame 12, the roof side rail 21, the rear pillar 24, the rear end 31, the wheel house inner 32, and the side pillar 34.

Note that in the side view, a front edge of the rear side panels 33 which is a rear edge of the side door openings S2 is formed so that a lower end thereof is located at substantially the same position as an upper end thereof in the vehicle longitudinal direction. As illustrated in FIGS. 2 to 4, the rear side panels 33 are comprised of side panel lower parts 37 to which the wheel house inners 32 are joined, and side panel upper parts 38 joined to an upper end of the side panel lower parts 37.

Each side panel lower part 37 forms a side wall of the cargo space, and also forms a rear wheel house 39 which covers a rear wheel together with the wheel house inners 32. For example, as is illustrated in FIGS. 3 and 4, the side panel lower parts 37 is a panel member having a thickness in the vehicle width direction, and is formed in a shape bulging outwardly in the vehicle width direction so that a part opposing to the wheel house inners 32 from outside in the vehicle width direction, forms a rear wheel house 39 together with the wheel house inners 32.

The part of the side panel lower part 37 bulging outwardly in the vehicle width direction is used as a wheel house outer part 37a, and the side panel lower part 37 constitutes the rear wheel house 39 by the wheel house inner 32 and the wheel house outer part 37a.

As illustrated in FIGS. 1 to 3, an opening S3 is formed in each side panel upper part 38 to have a substantially triangular shape in the side view, between the side pillar 34 and an upper reinforcement 62. The opening S3 is an opening to which a window glass (not illustrated) is attached.

As illustrated in FIGS. 1 and 3, each of the pair of left and right side pillars 34 couples in the vehicle vertical direction a rear part of the side sill 11 to the roof side rail 21, along a front edge of the rear side panel 33 which is a rear edge of the side door opening S2.

In more detail, as illustrated in FIGS. 3 and 5, each side pillar 34 has a substantially hat-shaped horizontal cross section (i.e., cut horizontally) protruding outwardly in the vehicle width direction, and forms a closed section extending in the vehicle vertical direction by joining a lower end thereof to the side sill 11 and joining an upper end thereof to the roof side rails 21, and joining an inward surface thereof in the vehicle width direction to an outward surface of the rear side panels 33. The side pillars 34 constitute a vehicle body frame extending in the vehicle vertical direction by forming the closed section extending in the vehicle vertical direction together with the rear side panels 33.

Further, as illustrated in FIG. 3, in each side pillar 34, door hinges 41 which pivotably support the rear side door 40 (see FIG. 1) so as to be openable and closable, which covers a rear part of the side door opening S2, are disposed substantially at the center in the vehicle vertical direction, and at a position separated from and downward of the center.

Here, a vehicle body front part of the vehicle 1 of this embodiment is briefly described using FIG. 6. As illustrated in FIG. 6, the vehicle body front part of the vehicle 1 includes, as members which forms the vehicle body frame of the vehicle 1, a pair of left and right front pillars 42 extending forwardly and downwardly from front ends of the roof side rails 21, a pair of left and right hinge pillars 43 each coupling a front end of the front pillars 42 to a front end of the side sills 11 in the vehicle vertical direction, and a cowl box 44 which couples upper ends of the hinge pillars 43 in the vehicle width direction.

As illustrated in FIG. 6, the vehicle body front part of the vehicle 1 includes, as the member which forms the vehicle body frame of the vehicle 1, apron reinforcements 51 extending in the vehicle longitudinal direction at positions separated from each other in the vehicle width direction, front side frames 52 extending in the vehicle longitudinal direction, below the apron reinforcements 51, suspension towers 53 which support upper ends of front suspension dampers (not illustrated) which constitute front suspensions (not illustrated), and front sub frames 54 disposed below the front side frames 52.

Although detailed illustration is omitted, each front pillar 42 is formed in a shape in which a closed section thereof which continues to the closed section of the roof side rails 21 is extended forwardly and downwardly from a front end of the roof side rails 21. Although detailed illustration is omitted, each hinge pillar 43 is formed in a shape in which a substantially rectangular closed section is extended in the vehicle vertical direction. Although detailed illustration is omitted, the cowl box 44 is formed in a shape in which a substantially rectangular closed section is extended in the vehicle width direction.

Although detailed illustration is omitted, each apron reinforcement 51 is formed in a shape in which a substantially rectangular closed section is extended in the vehicle longitudinal direction. As illustrated in FIG. 6, the apron reinforcements 51 are coupled at rear ends to upper ends of the hinge pillars 43.

Although detailed illustration is omitted, each front side frame 52 is formed in a shape in which a substantially rectangular closed section is extended in the vehicle longitudinal direction. The front side frames 52 are disposed inwardly in the vehicle width direction and downwardly of the apron reinforcements 51, and a rear end thereof is joined to a front end of a floor side frame (not illustrated) extending in the vehicle longitudinal direction underneath the floor panel 13. As illustrated in FIG. 6, each suspension tower 53 is formed in a substantially cylindrical shape in which a rear part of the apron reinforcements 51 is coupled to a rear part of the front side frames 52 in the vehicle vertical direction. An upper surface of each suspension tower 53 forms a front damper support 53a which supports the front suspension dampers. Suspension tower reinforcing members 55 which form a closed section extending in the vehicle vertical direction together with the suspension towers 53 are joined to an inward surface of the suspension towers 53 in the vehicle width direction.

The front sub frame 54 is formed in a rectangular frame shape in a plan view, comprised of a pair of left and right side members 56 extending in the vehicle longitudinal direction below the front side frames 52, a front cross member 57 which couples front ends of the side members 56 in the vehicle width direction, and a rear cross member 58 which couples the vicinity of rear ends of the side members 56 in the vehicle width direction.

Note that the pair of left and right side members 56, the front cross member 57, and the rear cross member 58 are each formed in a closed section having a substantially rectangular shape. The front sub frame 54 is coupled to the front parts and the rear parts of the front side frames 52 via coupling members which is formed by extending a substantially rectangular closed section in the vehicle vertical direction.

As illustrated in FIGS. 1 to 3, the vehicle 1 having the structure described above includes lower reinforcements 61 and the upper reinforcements 62 each disposed so as to couple the third floor cross member 16 to the rear header 23, and coupling members 63 coupling the wheel house inners 32 to the rear pillars 24.

As illustrated in FIGS. 2 and 3, each lower reinforcement 61 couples, inward of the rear side panel 33 in the vehicle width direction, the third floor cross member 16 to the rear side panel 33 located above the wheel house inner 32.

In more detail, as illustrated in FIGS. 2 and 5, the lower reinforcement 61 has a substantially hat-shaped horizontal cross section protruding inwardly in the vehicle width direction, and is formed, in the side view, in a shape extending in a substantially vehicle vertical direction along the wheel house inner 32 so as to pass through forward of the wheel house inner 32 and near the rear damper support 32a.

As illustrated in FIGS. 2 and 3, in the side view, the lower reinforcement 61 is joined at a lower end to the member end part 16b of the third floor cross member 16, is joined at an upper end to the vicinity of a lower end of the side panel upper part 38 located upward and slightly forward of the rear damper support 32a, and is joined at an outward surface in the vehicle width direction to the wheel house inner 32 and the side panel lower part 37.

That is, the lower reinforcements 61 form a closed section, together with the wheel house inners 32 and the rear side panels 33, which continues to the closed section formed by the third floor cross member 16 and extends rearwardly and upwardly from the third floor cross member 16 along the wheel house inners 32.

As illustrated in FIGS. 3 to 5, the upper reinforcement 62 couples, outward of the rear side panel 33 in the vehicle width direction, near upper end of the wheel house outer part 37a of the side panel lower part 37, to the rear header 23.

In more detail, as illustrated in FIGS. 3 to 5, the upper reinforcement 62 has a substantially hat-shaped horizontal cross section protruding outwardly in the vehicle width direction, and is formed in a shape extending in a substantially vehicle vertical direction along an outward surface of the rear side panel 33 in the vehicle width direction.

As illustrated in FIGS. 3 to 5, the upper reinforcement 62 forms a closed section extending in the vehicle vertical direction by joining, in the side view, the vicinity of a lower end thereof to the vicinity of an upper end of the lower reinforcement 61, having the rear side panel 33 therebetween, and joining an upper end thereof to the vicinity of a joint part of the roof side rail 21 and the rear pillar 24, and joining an inward surface thereof in the vehicle width direction to the rear side panel 33.

That is, as illustrated in FIGS. 2 to 5, the lower reinforcement 61 and the upper reinforcement 62 are disposed in the vehicle 1 so that the closed section formed inwardly in the vehicle width direction by the lower reinforcement 61 and the closed section formed outwardly in the vehicle width direction by the upper reinforcement 62 continue to each other via the rear side panel 33 therebetween.

Thus, the vehicle 1 comprises a vehicle body frame extending in the vehicle vertical direction by forming the closed section which couples the third floor cross member 16 to the rear header 23 by the lower reinforcements 61 and the upper reinforcements 62.

As illustrated in FIGS. 1 and 2, the coupling member 63 couples in the vehicle longitudinal direction a rear part of the rear damper support 32a of the wheel house inner 32 to the lower end of the rear pillar 24.

The coupling members 63 have a substantially inverted L-shaped lateral cross section, are joined at the front end to the vicinity of the rear damper supports 32a located rearward, so as to cover them from inside in the vehicle width direction and from above, and are joined to the vicinity of the rear end of the rear pillars 24 so as to cover them from inside in the vehicle width direction and from forward.

The vehicle 1 in this embodiment forms, by coupling the members having the closed section described above, a first annular vehicle body frame W1 and a second annular vehicle body frame W2 which become substantially annular in the front view, and a pair of left and right third annular vehicle body frames W3 and a pair of left and right fourth annular vehicle body frames W4 which become substantially annular in the side view. It will be appreciated that as used herein, "annular" means the constituting components form a complete loop, and does not necessarily mean the annular shape is perfectly round. Some of the annular shapes discussed herein may include straight edges.

Further, the vehicle 1 forms, by coupling the members having the closed section described above, a fifth annular vehicle body frame W5 and a sixth annular vehicle body frame W6 which become substantially annular in the front view, rearward of the first annular vehicle body frame W1, and a seventh annular vehicle body frame W7 which becomes substantially annular in the front view, forward of the first annular vehicle body frame W1.

For example, as illustrated in FIG. 7, the first annular vehicle body frame W1 is an annular vehicle body frame that is substantially annular in the front view, which constitutes the cargo space of the vehicle 1. The first annular vehicle body frame W1 is comprised of the left and right lower reinforcements 61 forming the closed section together with the wheel house inners 32, the left and right upper reinforcements 62 forming the closed section together with the rear side panels 33, the member end parts 16b of the third floor cross member 16 forming the closed section together with the wheel house inners 32, the member center part 16a of the third floor cross member 16 forming the closed section together with the floor panel 13, and the rear header 23 which is the closed section member.

As illustrated in FIG. 6, the second annular vehicle body frame W2 is formed near the front damper support 53a, and is an annular vehicle body frame which is substantially annular in the front view. The second annular vehicle body frame W2 is comprised of the cowl box 44 which is the closed section member, the left and right apron reinforcements 51 which are closed section members, the left and right suspension tower reinforcing members 55 forming the closed section together with the left and right suspension towers 53, the left and right front side frames 52 which are closed section members, and the front sub frame 54 which is the closed section member.

As illustrated in FIGS. 6 and 7, the pair of left and right third annular vehicle body frames W3 are annular vehicle body frames, each substantially annular in the side view and being formed along the side door opening S2. The third annular vehicle body frame W3 is comprised of the side pillar 34 which forms the closed section together with the rear side panel 33, the side sill 11 which is the closed section member, the roof side rail 21 which is the closed section member, and the hinge pillar 43 which is the closed section member.

As illustrated in FIG. 7, each of the pair of left and right fourth annular vehicle body frames W4 is the annular vehicle body frame which is substantially annular in the side view and is configured to couple the first annular vehicle body frame W1 having the substantially annular shape in the front view to the third annular vehicle body frame W3 having the substantially annular shape in the side view.

The fourth annular vehicle body frame W4 is comprised of the side pillar 34 which forms the closed section together with the rear side panel 33, the left or right lower reinforcement 61 which forms the closed section together with the wheel house inner 32, the left or right upper reinforcements 62 which forms the closed section together with the rear side panel 33, the member end part 16b of the third floor cross member 16 which forms the closed section together with the wheel house inner 32, the rear side frame 12 which is the closed section member, and the roof side rail 21 which is the closed section member.

As illustrated in FIG. 7, the fifth annular vehicle body frame W5 is an annular vehicle body frame which is substantially annular in the front view and is formed near the rear damper support 32a. The fifth annular vehicle body frame W5 is coupled to the second annular vehicle body frame W2 via the third annular vehicle body frame W3 which is substantially annular in the side view and the fourth annular vehicle body frame W4 which is substantially annular in the side view.

For example, the fifth annular vehicle body frame W5 is comprised of the lower parts of the left and right lower reinforcements 61 which form the closed sections together with the wheel house inners 32, the coupling members 63, the rear end cross member 36 forming the closed section together with the rear end panel 35, the member end parts 16b of the third floor cross member 16 which form the closed section together with wheel house inners 32, and the member center part 16a of the third floor cross member 16 which forms the closed section together with the floor panel 13.

As illustrated in FIG. 7, the sixth annular vehicle body frame W6 is an annular vehicle body frame which is substantially annular in the front view and is formed along the back door opening S1. This sixth annular vehicle body frame W6 is comprised of the rear header 23 which is the closed section member, the left and right rear pillars 24 which are the closed section members, and the rear end cross member 36 which forms the closed section together with the rear end panel 35.

Note that the sixth annular vehicle body frame W6 is coupled to the second annular vehicle body frame W2 via the first annular vehicle body frame W1 which is substantially annular in the front view, the third annular vehicle body frames W3 which are substantially annular in the side view, and the fourth annular vehicle body frames W4 which are substantially annular in the side view.

As illustrated in FIG. 7, the seventh annular vehicle body frame W7 is an annular vehicle body frame which is substantially annular in the front view and is formed in the cabin of the vehicle 1. The seventh annular vehicle body frame W7 is comprised of the left and right side pillars 34 which forms the closed sections together with the rear side panels 33, the left and right side sills 11 which are closed section members, the second floor cross member 15 which forms the closed section together with the floor panel 13, the left and right roof side rails 21 which are the closed section members, and the roof reinforcement 22 which forms the closed section together with the roof panel.

As described above, the body structure of the vehicle 1 includes the pair of left and right rear damper supports 32a which are provided to the rear wheel houses 39 covering the rear wheels of the vehicle 1, and support the upper ends of the rear suspension dampers, the pair of left and right rear side panels 33 which integrally form the side walls of the vehicle 1 with the rear wheel houses 39, the third floor cross member 16 which couples the left and right rear wheel houses 39 in the vehicle width direction, forward and below the rear damper supports 32a, and the rear header 23 which forms an upper edge of the back door opening S1 of the vehicle 1. The body structure of the vehicle 1 includes, rearward of the rear edges of the side door openings S2, the pair of left and right lower reinforcements 61 which are coupled at the lower ends to the third floor cross member 16 and coupled at the upper ends to the vicinity of the rear damper supports 32a, and the pair of left and right upper reinforcements 62 which are coupled at the lower ends to the upper ends of the lower reinforcements 61 and coupled at the upper ends to the rear header 23. The first annular vehicle body frame W1 which is substantially annular in the front view is comprised of the third floor cross member 16, the rear header 23, the pair of left and right lower reinforcements 61, and the pair of left and right upper reinforcements 62. Therefore, the support rigidity of the rear suspension dampers can be improved without being influenced by the shape of the side pillars 34 which form the rear edges of the side door openings S2.

For example, the body structure of the vehicle 1 can couple the third floor cross member 16 to the rear header 23 by the lower reinforcements 61 and the upper reinforcements 62, without intervention of the side pillars 34 which form the rear edges of the side door openings S2.

Therefore, the body structure of the vehicle 1 can easily comprise the first annular vehicle body frame W1 which becomes substantially annular in the front view and passes through the vicinity of the rear damper support 32a, without being influenced by the shape of the side pillars 34 which form the rear edge of the side door openings S2.

Here, since the upper ends of the upper reinforcements 62 are coupled to the rear header 23, the body structure of the vehicle 1 can improve the rigidity near the rear damper supports 32a and the rigidity of the parts which form the opening edges of the back door openings S1 by the first annular vehicle body frame W1 which is substantially annular in the front view. Therefore, the body structure of the vehicle 1 can improve the support rigidity of the rear suspension dampers, without being influenced by the shape of the side pillars 34 which form the rear edges of the side door openings S2.

Moreover, by providing the coupling member 63 which couples in the vehicle longitudinal direction, near the rear damper support 32a to the rear pillar 24 which forms the opening edge of the back door opening S1, the body structure of the vehicle 1 can form the substantially triangular shape having a coupling part of the rear pillar 24 and the coupling member 63 as a vertex, which is comprised of the rear pillar 24, the coupling member 63, and the lower reinforcement 61 and the upper reinforcement 62.

Thus, the body structure of the vehicle 1 can form a truss structure which becomes substantially annular in the side view, comprised of the rear pillar 24, the coupling member 63, and the lower reinforcement 61 and the upper reinforcement 62, and can support the vicinity of the rear damper support 32a by the truss structure which becomes substantially annular in the side view.

Thus, since the body structure of the vehicle 1 can further improve the rigidity near the rear damper support 32a by the collaboration of the first annular vehicle body frame W1 which becomes substantially annular in the front view and the truss structure which is substantially annular in the side view, the support rigidity of the rear suspension damper can be improved.

The body structure of the vehicle 1 includes the pair of left and right rear side frames 12 extending in the vehicle longitudinal direction along the lower ends of the rear wheel houses 39, the pair of left and right side sills 11 which are coupled to the front ends of the rear side frames 12 and forms the lower edges of the side door openings S2 of the vehicle 1, the pair of left and right roof side rails 21 extending in the vehicle longitudinal direction, of which the rear ends are coupled to the rear header 23, the pair of left and right front pillars 42 extending forwardly and downwardly from the roof side rails 21, the pair of left and right side pillars 34 which couple the rear ends of the side sills 11 to the roof side rails 21 in the vehicle vertical direction and form the rear edges of the side door openings S2, the pair of left and right hinge pillars 43 which couple the front ends of the side sills 11 to the front ends of the front pillars 42 in the vehicle vertical direction and form the front edges of the side door openings S2. The body structure of the vehicle 1 further includes the second annular vehicle body frame W2 which is the annular vehicle body frame which is substantially annular in the front view, passing through the cowl box 44 which couples the upper parts of the hinge pillars 43, and the vicinity of the pair of left and right front damper supports 53a which support the front suspension dampers of the vehicle 1. The body structure of the vehicle 1 also includes the third annular vehicle body frame W3 which is the annular vehicle body frame which becomes substantially annular by being formed along the side door opening S2, and which is comprised of the side sill 11, the roof side rail 21, the front pillar 42, the side pillar 34, and the hinge pillar 43. The body structure of the vehicle 1 also includes the fourth annular vehicle body frame W4 which is the annular vehicle body frame which becomes substantially annular in the side view, and which is comprised of the rear side frame 12, the roof side rail 21, the side pillar 34 of the third annular vehicle body frame W3, the lower reinforcement 61 of the first annular vehicle body frame W1, and the upper reinforcement 62 of the first annular vehicle body frame W1. Therefore, the body structure of the vehicle 1 can improve more certainly the support rigidity of the front suspension dampers, and the support rigidity of the rear suspension dampers, in the entire vehicle.

Specifically, since the side pillar 34 can be shared by the third annular vehicle body frame W3 and the fourth annular vehicle body frame W4, and the lower reinforcement 61 and the upper reinforcement 62 can be shared by the first annular vehicle body frame W1 and the fourth annular vehicle body frame W4, the body structure of the vehicle 1 can couple in the vehicle longitudinal direction the first annular vehicle body frame W1 which passes through the vicinity of the rear damper support 32a to the second annular vehicle body frame W2 which passes through the vicinity of the front damper support 53a, without increasing the number of components.

Therefore, since the body structure of the vehicle 1 can couple the front damper support 53a to the rear damper support 32a, it can improve the rigidity near the front suspension damper support, and the rigidity near the rear damper support 32a, in the entire vehicle. Further, since the body structure of the vehicle 1 can distributedly transfer the load which acts on the front damper support 53a and the rear damper support 32a efficiently to a farther part of the vehicle body via the entire vehicle body, it can improve the riding comfort.

Therefore, by providing the third annular vehicle body frame W3 and the fourth annular vehicle body frame W4 which become substantially annular in the side view, the body structure of the vehicle 1 can improve more certainly the support rigidity of the front suspension damper and the support rigidity of the rear suspension damper in the entire vehicle.

Further, by providing the rear side door 40 which covers the rear part of the side door opening S2, and by providing the door hinges 41 which supports openably and closably the rear end of the rear side door 40 to the side pillar 34, the vehicle body structure of the vehicle 1 can support openably and closably the rear end of the rear side door 40 by the third annular vehicle body frame W3 and the fourth annular vehicle body frame W4 which become substantially annular in the side view, and thus, it can improve the support rigidity of the rear side door 40.

When an object collides with a side part of the vehicle 1, the body structure of the vehicle 1 can distributedly transfer the impact load acting inwardly in the vehicle width direction through the rear side door 40 from the third annular vehicle body frame W3 and the fourth annular vehicle body frame W4 which become substantially annular in the side view to the first annular vehicle body frame W1 and the second annular vehicle body frame W2 which become substantially annular in the front view.

Thus, the body structure of the vehicle 1 can further reduce the entry of the rear side door 40 into the cabin in a side collision. Therefore, since the rear side door 40 is coupled to the side pillar 34 via the door hinges 41, the body structure of the vehicle 1 can improve the support rigidity of the rear side door 40, and the side collision performance, as well as the support rigidity of the front suspension damper and the support rigidity of the rear suspension damper.

Since the opening S3 to which the window glass is attached is formed between the side pillar 34 and the upper reinforcement 62 in the fourth annular vehicle body frame W4, the body structure of the vehicle 1 can improve the visibility of the rear side part of the vehicle, while securing the support rigidity of the front suspension damper and the support rigidity of the rear suspension damper.

Since the fifth annular vehicle body frame W5 which passes through the vicinity of the rear damper support 32a is provided, in addition to the first annular vehicle body frame W1 which passes through the vicinity of the rear damper support 32a, the body structure of the vehicle 1 can further improve the support rigidity of the rear suspension damper.

Further, since the sixth annular vehicle body frame W6 which is substantially annular in the front view is formed by the rear header 23 of the first annular vehicle body frame W1 which is the closed section member, and the rear end cross member 36 of the fifth annular vehicle body frame W5 which forms the closed section together with the rear end panel 35, the body structure of the vehicle 1 can further improve the rigidity near the rear damper supports 32a by the collaboration of the first annular vehicle body frame W1, the fifth annular vehicle body frame W5, and the sixth annular vehicle body frame W6, thereby improving more certainly the support rigidity of the rear suspension dampers.

As described above, since the side pillar 34 is a substantially straight member, when forming the third annular vehicle body frame W3 and the fourth annular vehicle body frame W4 which share the side pillar 34, all the members which constitute the respective annular vehicle body frames are substantially straight to form perfect rectangular shapes, without having any deflection or bending points, which improves the rigidity of the annular vehicle body frames.

Regarding the correspondence of the structure of the present disclosure to the above embodiment, although a floor cross member of the present disclosure corresponds to the third floor cross member 16 of the embodiment, and similarly below, an annular vehicle body frame having a substantially annular shape in a front view corresponds to the first annular vehicle body frame W1, the present disclosure is not limited only to the structure of the above embodiment, and may be implemented in many embodiments.

For example, although in the above embodiment the vehicle body structure is provided with the lower reinforcement 61 inward of the rear side panel 33 in the vehicle width direction, and the upper reinforcement 62 outward of the rear side panel 33 in the vehicle width direction, it is not limit to this structure, and the vehicle body structure may be provided with the lower reinforcement 61 outward of the rear side panel 33 in the vehicle width direction, and the upper reinforcement 62 inward of the rear side panel 33 in the vehicle width direction.

Alternatively, the vehicle body structure may be provided with the lower reinforcement 61 and the upper reinforcement 62 inward of the rear side panel 33 in the vehicle width direction, or the vehicle body structure may be provided with the lower reinforcement 61 and the upper reinforcement 62 outward of the rear side panel 33 in the vehicle width direction. In such a case, the lower reinforcement 61 and the upper reinforcement 62 may be formed integrally.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
11 Side Sill
12 Rear Side Frame
16 Third Floor Cross Member
21 Roof Side Rail
23 Rear Header
24 Rear Pillar
32a Rear Damper Support
33 Rear Side Panel
34 Side Pillar
39 Rear Wheel House
40 Rear Side Door
41 Door Hinge
42 Front Pillar
43 Hinge Pillar
44 Cowl Box
53a Front Damper Support
61 Lower Reinforcement
62 Upper Reinforcement
63 Coupling Member
S1 Back Door Opening
S2 Side Door Opening
S3 Opening
W1 First Annular Vehicle Body Frame
W2 Second Annular Vehicle Body Frame
W3 Third Annular Vehicle Body Frame
W4 Fourth Annular Vehicle Body Frame

What is claimed is:

1. A body structure of a vehicle, comprising:
a left rear wheel house and a right rear wheel house covering a left rear wheel and a right rear wheel of the vehicle, respectively;
a left rear damper support and a right rear damper support supporting upper ends of rear suspension dampers provided to the left rear wheel house and the right rear wheel house;
a left rear side panel and a right rear side panel forming side walls of the vehicle, integrally with the left rear wheel house and the right rear wheel house;
a floor cross member coupling the left rear wheel house and the right rear wheel house in a vehicle width direction, forward and downward of the rear damper supports;
a rear header forming upper edges of a back door opening of the vehicle;
a left lower reinforcement and a right lower reinforcement coupled at lower ends thereof to the floor cross member and coupled at upper ends thereof to regions adjacent the left rear damper support and the right rear damper support, respectively, rearward of rear edges of side door openings of the vehicle;
a left upper reinforcement and a right upper reinforcement coupled at lower ends thereof to the upper ends of the left lower reinforcement and the right lower reinforcement, respectively; and
a left roof side rail and a right roof side rail extending in a vehicle longitudinal direction and coupling the rear header to an upper end of the left upper reinforcement and an upper end of the right upper reinforcement, respectively,
wherein a first annular vehicle body frame having a substantially annular shape in a front view is comprised of the floor cross member, the rear header, the pair of left and right lower reinforcements, the pair of left and right rear side panels, and the pair of left and right upper reinforcements;
wherein an upper end of the left rear side panel is sandwiched between layers of the left roof side rail;
wherein an upper end of the right rear side panel is sandwiched between layers of the right roof side rail;
wherein a lower end of the right rear side panel is sandwiched between the right upper reinforcement and the right lower reinforcement; and
wherein a lower end of the left rear side panel is sandwiched between the left upper reinforcement and the left lower reinforcement.

2. The body structure of claim 1,
wherein the upper end of the right upper reinforcement is directly coupled to an upper end of a right rear pillar, and a right coupling member couples a lower end of the right rear pillar to the region adjacent the right rear damper support in the vehicle longitudinal direction, forming an opening edge of the back door opening; and
wherein the upper end of the left upper reinforcement is directly coupled to an upper end of a left rear pillar, and a left coupling member couples a lower end of the left rear pillar to the region adjacent the left rear damper support in the vehicle longitudinal direction, forming the opening edge of the back door opening.

3. The body structure of claim 1, further comprising:
a pair of left and right rear side frames extending in a vehicle longitudinal direction along a lower end of the left rear wheel house and the right rear wheel house;
a pair of left and right side sills coupled to front ends of the rear side frames and forming lower edges of the side door openings;
a pair of left and right front pillars extending forward and downward from front ends of the roof side rails;
a pair of left and right side pillars coupling rear ends of the side sills and the roof side rails in a vehicle vertical direction and forming rear edges of the side door openings; and
a pair of left and right hinge pillars coupling front ends of the side sills and front ends of the front pillars in the vehicle vertical direction, and forming front edges of the side door openings,
the body structure further comprising:
a second annular vehicle body frame having a substantially annular shape in the front view by passing through a cowl box coupling upper parts of the hinge pillars, the second annular vehicle body frame being adjacent a pair of left and right front damper supports supporting front suspension dampers of the vehicle;
third annular vehicle body frames each having a substantially annular shape in a side view, and each formed along the side door openings, by being comprised of the side sills, the roof side rails, the front pillars, the side pillars, and the hinge pillars; and
fourth annular vehicle body frames each having a substantially annular shape in the side view, and each comprised of the rear side frames, the roof side rails, the side pillars of the third annular vehicle body frames, the lower reinforcements of the first annular vehicle body frame, and the upper reinforcements of the first annular vehicle body frame.

4. The body structure of claim 3, further comprising rear side doors covering rear parts of the side door openings,
wherein each of the side pillars includes a door hinge configured to openably and closably support a rear end of a respective rear side door.

5. The body structure of claim 3, wherein an opening to which a window glass is attached is formed between the side pillar and the upper reinforcement in each of the fourth annular vehicle body frames.

6. The body structure of claim 4, wherein the side pillars are straight members coupling a rear end of the side sills and the roof side rails in the vehicle vertical direction.

7. The body structure of claim 1,
wherein the left upper reinforcement has a left horizontal cross section protruding outwardly in the vehicle width direction and is formed in a shape extending in a vehicle vertical direction along an outward surface of the left rear side panel in the vehicle width direction; and
wherein the right upper reinforcement has a right horizontal cross section protruding outwardly in the vehicle width direction and is formed in a shape extending in the vehicle vertical direction along an outward surface of the right rear side panel in the vehicle width direction.

* * * * *